(12) United States Patent
Cochran et al.

(10) Patent No.: US 11,474,379 B2
(45) Date of Patent: Oct. 18, 2022

(54) METHOD AND APPARATUS FOR DETERMINING DECENTRATION OF OPHTHALMIC LENSES

(71) Applicant: MASBEIRN CORPORATION, Lakewood, CO (US)

(72) Inventors: Brett J Cochran, Littleton, CO (US); Sean A. Masler, Edwards, CO (US); William V. Masler, Morrison, CO (US); Troy A. Miller, Aurora, CO (US)

( * ) Notice: Subject to any disclaimer, the term of this patent is extended or adjusted under 35 U.S.C. 154(b) by 187 days.

(21) Appl. No.: 16/590,098

(22) Filed: Oct. 1, 2019

(65) Prior Publication Data

US 2021/0096396 A1 Apr. 1, 2021

(51) Int. Cl.
*G02C 7/04* (2006.01)
*G02C 7/02* (2006.01)

(52) U.S. Cl.
CPC .............. *G02C 7/049* (2013.01); *G02C 7/021* (2013.01); *G02C 7/027* (2013.01)

(58) Field of Classification Search
CPC .......... G02C 7/021; G02C 7/027; G02C 7/04; G02C 7/041; G02C 7/044; G02C 7/049; A61B 3/112; A61B 3/125

USPC ............... 351/159.28, 159.69, 204, 208, 219
See application file for complete search history.

(56) References Cited

U.S. PATENT DOCUMENTS

| 4,322,139 | A | * | 3/1982 | Wichterle | G02C 7/04 |
| | | | | | 264/1.1 |
| 6,802,605 | B2 | | 10/2004 | Cox et al. | |
| 8,092,016 | B2 | | 1/2012 | Blum et al. | |
| 2006/0118263 | A1 | * | 6/2006 | Silvestrini | G02C 7/165 |
| | | | | | 164/46 |
| 2009/0033864 | A1 | | 2/2009 | Shone et al. | |
| 2012/0188502 | A1 | | 7/2012 | Abderhalden | |
| 2015/0261294 | A1 | * | 9/2015 | Urbach | G06F 3/015 |
| | | | | | 345/156 |
| 2018/0210230 | A1 | * | 7/2018 | Heavyside | G02C 7/047 |
| 2019/0187487 | A1 | * | 6/2019 | Abe | B24B 13/0055 |

* cited by examiner

*Primary Examiner* — Jordan M Schwartz
(74) *Attorney, Agent, or Firm* — Reilly Intellectual Property Law Firm

(57) ABSTRACT

A method and apparatus for a diagnostic lens to determine decentration from the optical axis or pupil center in the manufacture of a prescription ophthalmic lens.

10 Claims, 8 Drawing Sheets

INITIAL VISIT ORDER FORM

Circle the axis which has the most hash marks inside the pupil.
Please note the amount of hash marks.

OD:  OS:
Number of hashmarks: _____  Number of hashmarks: _____

METHOD AND APPARATUS FOR DETERMINING DECENTRATION OF OPHTHALMIC LENSES

The following is a method and apparatus for improving visual clarity in ophthalmic lenses. More specifically, the method and apparatus allow use of a diagnostic lens to determine decentration from the optical axis or pupil center in the manufacture of a spherical, aspheric, astigmatic or multi-focal lens.

BACKGROUND AND FIELD

Presbyopia is a condition that prevents an individual from focusing on objects that are relatively near. Age generally contributes to this as the eye is less able to bend the natural lens, to focus on objects that are relatively near to the eye. There are different methods used to correct presbyopia with ophthalmic lenses including use of mono-vision in which a single vision lens is used in one eye for correction of distance vision and a second lens is used in the second eye for correction of near vision. Another method is use of bi-focal or multi-focal lenses in both eyes which have regions of correction in each lens for simultaneous correction. Simultaneous vision ophthalmic lenses have a center lens that can be the distance (center distance or CD) or near (center near of CN) refractive power. The distance and near regions are concentrically arranged around the geometric center of the lens with at least two zones each having different powers.

Fitting of bi-focal and multifocal lenses presents a number of problems in that the fitting is currently very subjective and may consist of trial and error with the lenses. There are many factors that determine success of the fitting a lens and one factor that can affect the patient satisfaction or success of the lens is the quality of vision while wearing the lens.

There are also many variables that impact the quality of vision while wearing ophthalmic lenses including the fit of the lens, shape of the eye, refraction correction and dryness of the eye, to name a few. Further patient satisfaction with the lens also has many variables such as distance vision satisfaction, near vision satisfaction, overall vision satisfaction and glare perception.

One problem with the quality of vision while wearing a lens is that it is known that contact lenses may decenter while on the eye. Decentration occurs when the ophthalmic lens positions off the center of eye. Lenses can decenter downwardly and outwardly towards the temporal area, decentration inferior and temporal or inferior or inferior nasal. The pupil of the eye is treated as the center and the remainder of the eye shape is generally aspherical. When placing a lens on the eye, the lens optical axis will often decenter below or peripheral to the pupil or the visual axis. This can cause variations in vision quality especially when using a multifocal lens. Decentration may occur as a result of many factors and is different in every individual and can be different in each individual eye for the same user. Ophthalmic lenses decenter due to the weight of the lens, gravity, upper eyelid pressure and the shape of the eye, to name a few.

There is a need for an ophthalmic lens that provides decentration accommodation for improved visual clarity in single vision, bifocal, aspherical, toric and multifocal lenses by centering the optical axis of the lens over the center of the pupil and or the visual axis. In accordance with the disclosure, there is provided an ophthalmic lens decentration diagnostic device comprising of either or a combination thereof of a spherical, aspherical, multifocal, bifocal, or toric ophthalmic lens having visible markings or a grid pattern on a surface of the lens, the markings comprising radially extending and circumferentially aligned position system or alignment members, and the plurality of markings further comprising circumferentially spaced azimuth indicators. The plurality of markings are arranged in a plurality of groups, the plurality of groups comprising at least six groups, each group of the plurality of groups comprising at least four equidistantly spaced identical markings that are each radially aligned within the group as radially extending markings, the plurality of groups arranged equidistantly spaced circumferentially around the entire circumference of the lens with the plurality of markings within the plurality of groups as alignment members. The visible markings may be embedded within the lens and comprise laser etchings using laser technology, or permanent ink on a surface of the lens. The lens also has a positional placement indicator or lens alignment indicator marking and the alignment members each represent 0.25 mm of optic zone offset and form a baseline circular marking. The azimuth indicators comprise degree measurements and represent positional optic zone offset.

There is also provided a method of determining decentration accommodation of an ophthalmic lens, the steps comprising placement of a specialized lens on an eye over the visual axis and or pupil center, the lens having a grid pattern on the surface of the lens, evaluating the orientation of the grid pattern and recording azimuth and alignment on a computer database, and generating at least one lens with decentration zones. This results in a shifting of the location of the optical alignment zones based on the evaluation information. The method further includes aligning the lens with a placement indicator and estimating a correction degree based upon the viewing of said grid pattern.

DRAWINGS

DETAILED DESCRIPTION

There is shown in FIGS. 1-7 a method and apparatus for determining lens decentration accommodation. This allows the optical axis of the lens to be centered over the pupil or visual axis for optimum visual acuity.

Figure 1:
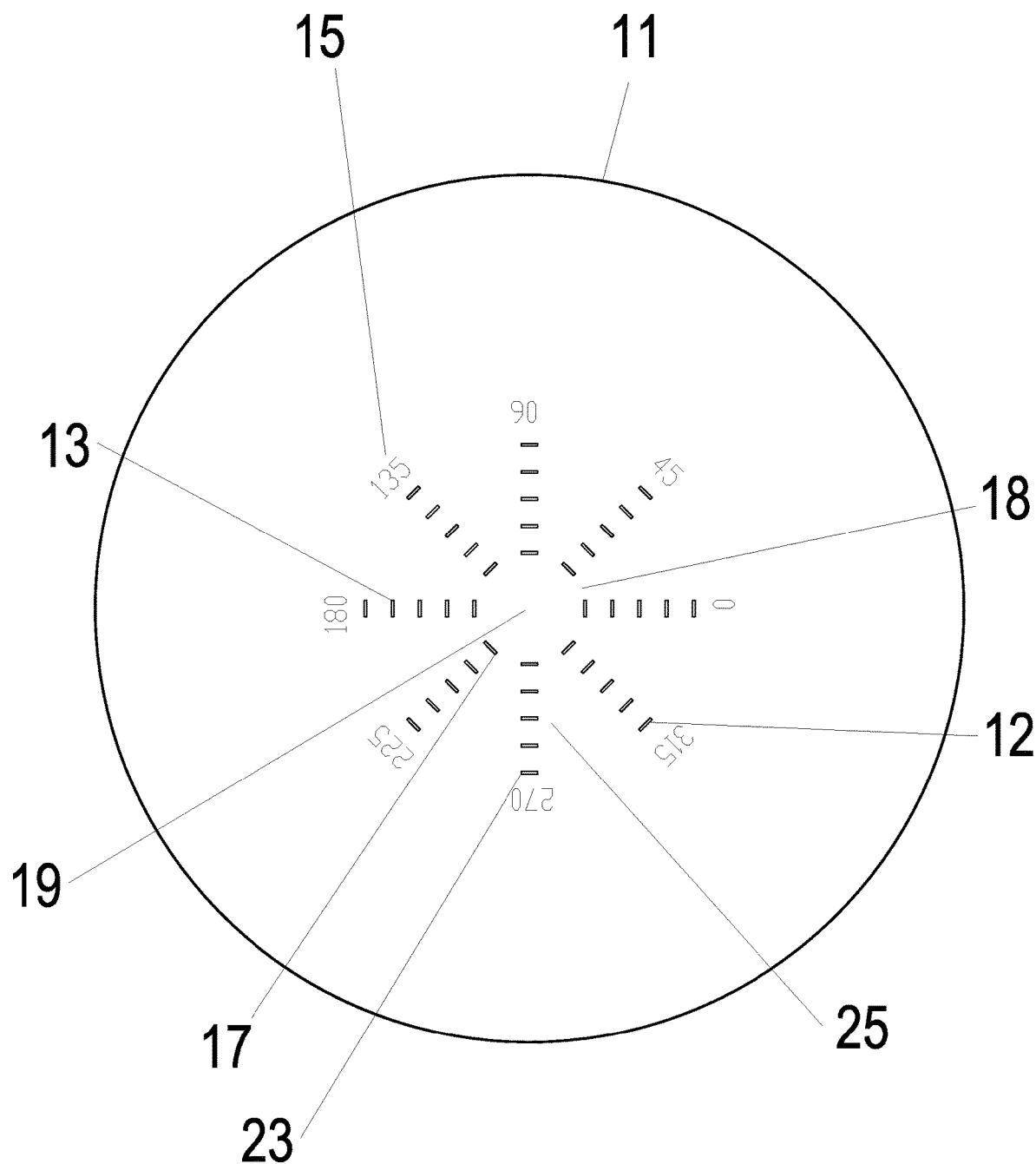
FIG. 1 is a front view of a diagnostic lens.
Figure 2:
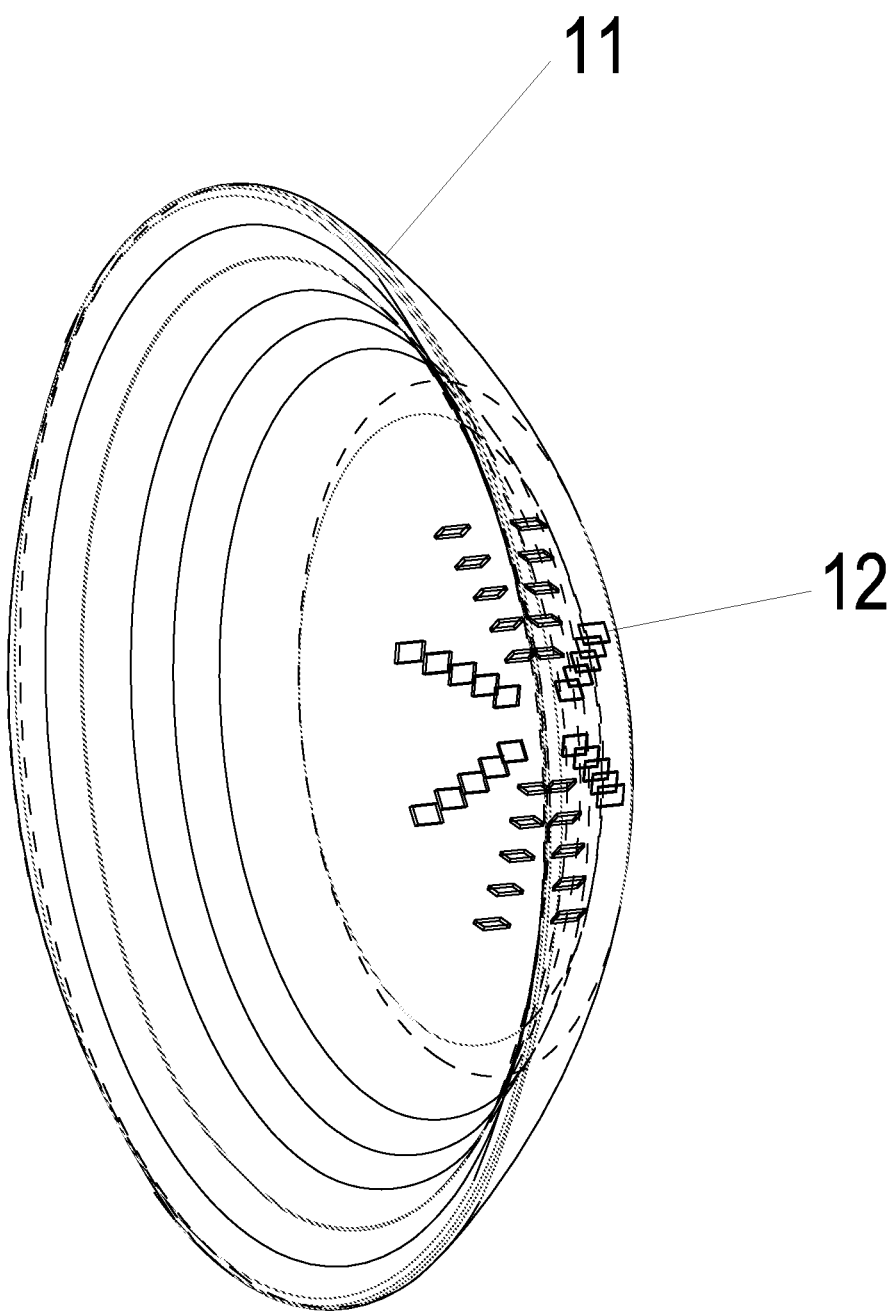
FIG. 2 is a perspective view of FIG. 1.
Figure 3:
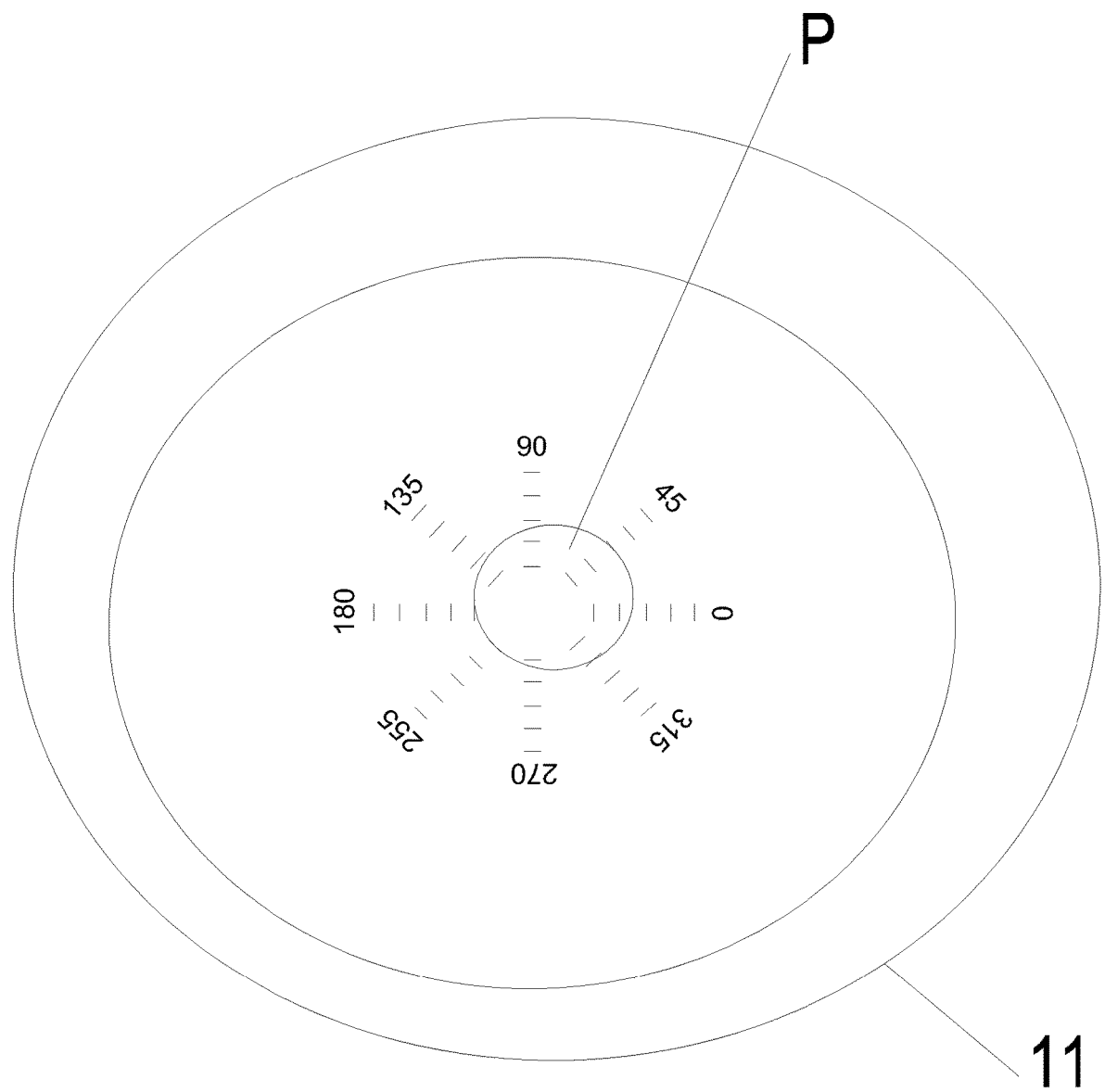
FIG. 3 is a front view of a diagnostic lens showing a pupil.

FIG. 1 and FIG. 2 are views of a diagnostic decentration lens 11. The lens 11 is clear so that markings or a grid pattern 12 on the lens may be viewed by a practitioner when the lens is placed on the eye and is manufactured of standard ophthalmic lens materials known in the art. The lens 11 contains markings which may be embedded on the lens using laser technology or permanent ink may be used as well. The markings may be embedded within the lens or placed on the anterior or posterior surface of the lens. The markings or grid pattern consist of alignment marks 13 making up a position scale 25 and azimuth or angle indicators 15. Center alignment marks 17 of the lens 11 generally commence at a 2 mm distance from the center 19 of inner circle 18 but may also have a range from 0.5 mm to 5 mm from center 19. The center alignment marks 17 form an inner circle 18, representing the location of the pupil in the average eye. The average pupil is 4.0 mm to 4.5 mm in diameter under normal lighting conditions. The inner indication marks form a circle with a diameter that must be within the average pupil diameter of 4.0 mm to 4.5 mm. The inner circle formed is set at 2 mm as standard and can range from 0.50 mm to 4.5 mm. Inner circle diameters can be designed for other than average pupil diameters with ranges of the inner circle between 0.50 mm and 8.0 mm. Additionally, the inner indicating marks can reference the limbal or iris diameter and can be designed between 8.0 mm and 11.5 mm.

Figure 8:
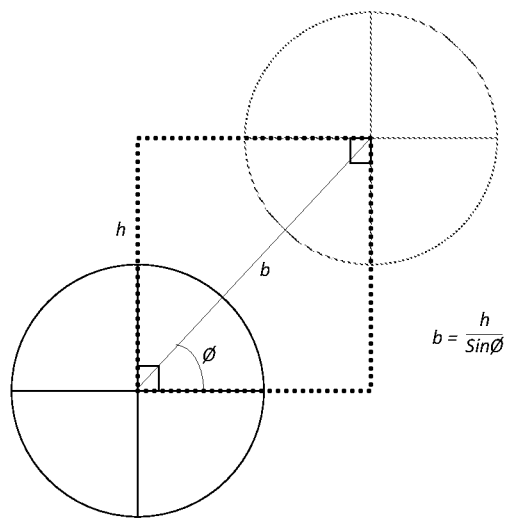
FIG. 8 is a diagram of a spherical coordinate system.

The alignment marks 13 are in equidistant spaced relation to one another and represent a 0.25 mm accommodation in actual optic zone adjustment on the final prescription lens, to be discussed in more detail. The alignment marks 13 extend radially and are circumferentially aligned. The angle or azimuth indicators 15 are circumferentially aligned and range from 0° to 315° for a total of 360°. Each indicator is 45° equidistant apart and different azimuth notations may be used without departing from the scope of the disclosure. Azimuth is an angular measurement in a spherical coordinate system. The vector from an origin to a point of interest is projected perpendicularly onto a reference plane; the angle between the projected vector and a reference vector on the reference plane is the azimuth as shown in FIG. 8.

The angle or azimuth indicator 15 is a location indicator for the zone adjustment. The lens add zone is then offset to mimic the needed placement of the zone in a prescription lens. The alignment marks 13 provide location for the azimuth of decentration.

The lower portion of the lens has a placement indicator for alignment of the lens 11 on the eye. In this case, the placement indicator 23 is at 270° but any other type or position of indicator may be used without departing from the scope.

Preferred candidates for fitting have a range of presbyopic correction of +1.75 or greater diopters. Patients with keratoconus and PMD, Dry-eye, post-surgical, high cylinder and high myope are conditions that will not impact the correct fitting of the lens. Certain conditions such as presbyopic correction of less than +1.50, diplopia, cataracts, glaucoma and macular degeneration may impact the fitting and have to be evaluated on a case-by-case basis. Once a determination is made as to the type of lens to be used based on known eye profile data, adding multifocal optics is the preferred next step. The optimal lens should have a good physical fit with proper clearance, limbal coverage and edge alignment.

Step 1: Placement of the diagnostic lens 11 on the eye of the patient. The method for each eye will be duplicated. A standard evaluation of the trial lens is conducted to achieve optimal diameter, limbic clearance, proper edges and sagittal depth.

Step 2: the diagnostic lens 11 must be aligned using the placement indicator 23 to verify that the lens is oriented in the proper position for decentration evaluation. The lens is inserted onto the eye with the 90° azimuth positioned at the superior quadrant or top of the eye. The lens 11 is marked with an indicator at the bottom (or at 6 o'clock) to ensure proper placement of the lens on the eye.

Step 3: evaluate the center-near optical alignment over the visual axis by locating the patient pupil P positioning under the diagnostic lens. See FIG. 3 and FIG. 4. It is to be understood that decentration may occur and therefore the patient pupil P may not be located at the center of the diagnostic lens center 19 of the inner circle 18.

Figure 4:
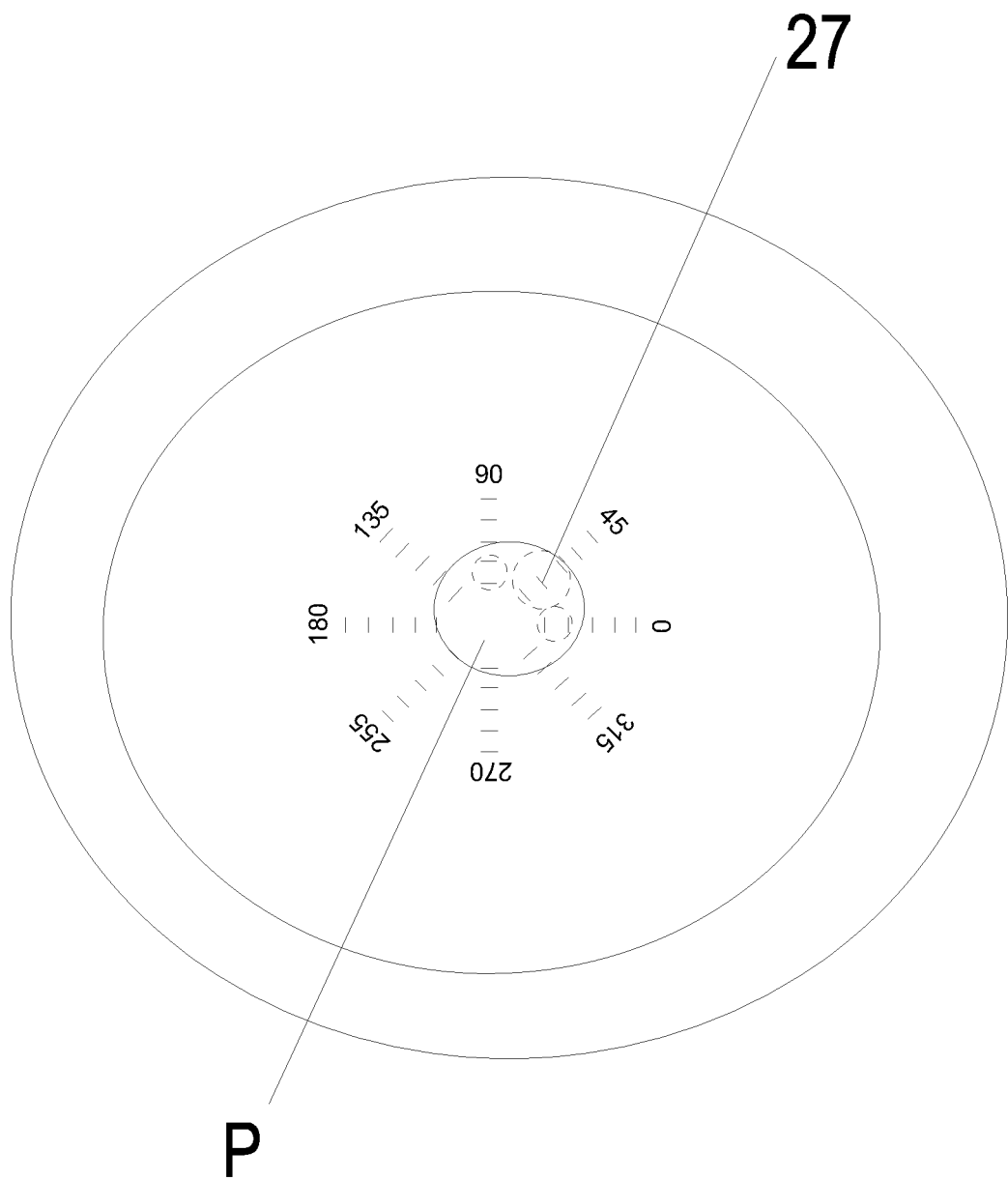
FIG. 4 is a front view of the diagnostic lens of FIG. 1 demonstrating offset zones.
Figure 5:
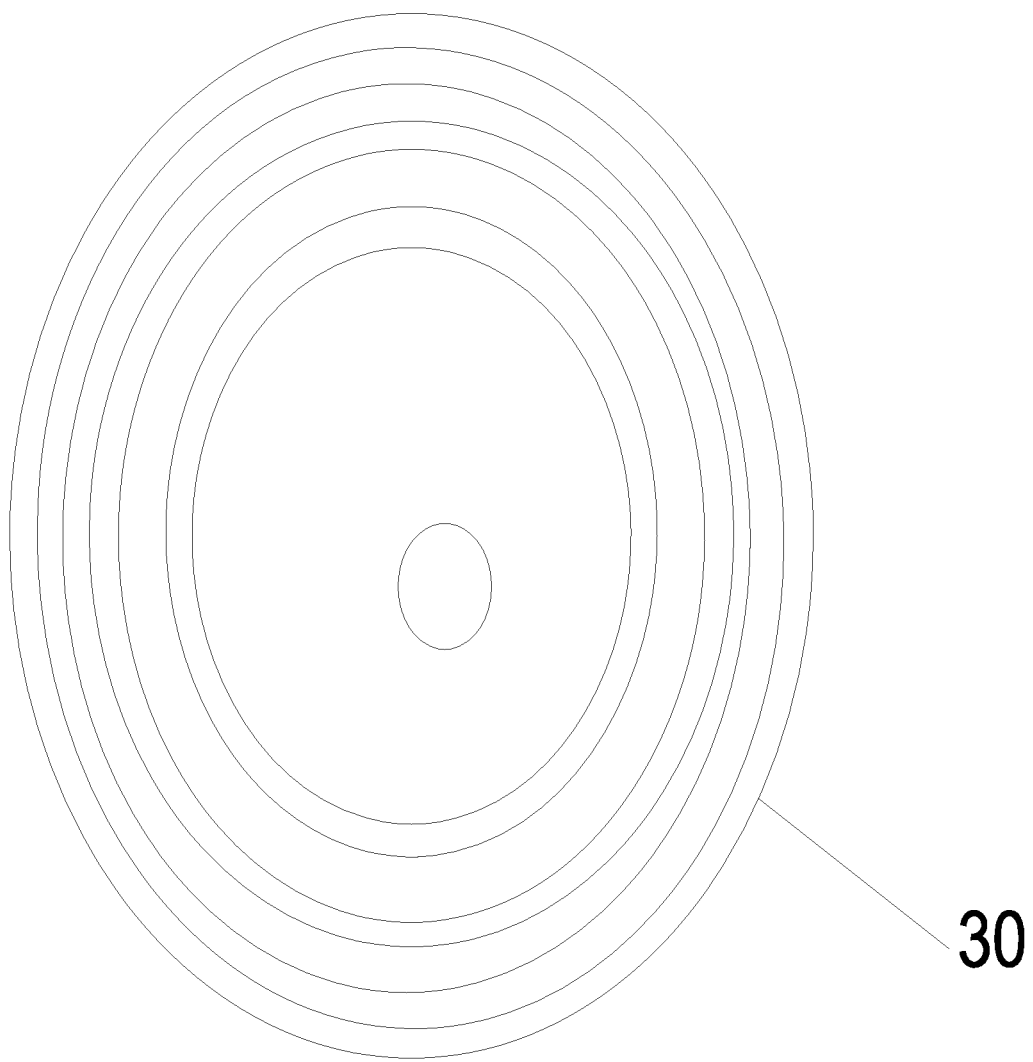
FIG. 5 is a front perspective view of a prescription lens with decentration accommodation.
Figure 6:
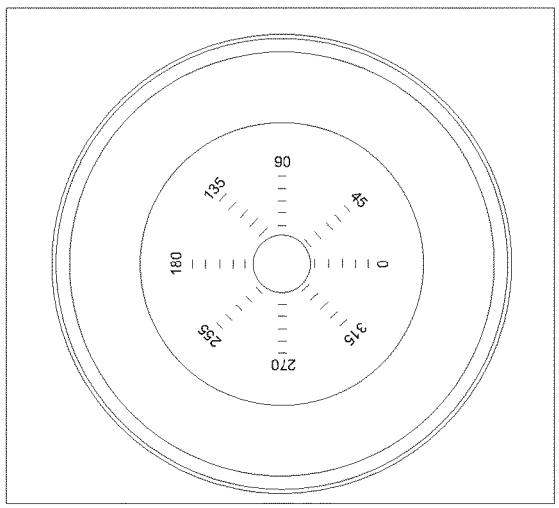
FIG. 6 is a diagnostician checklist.
Figure 6:
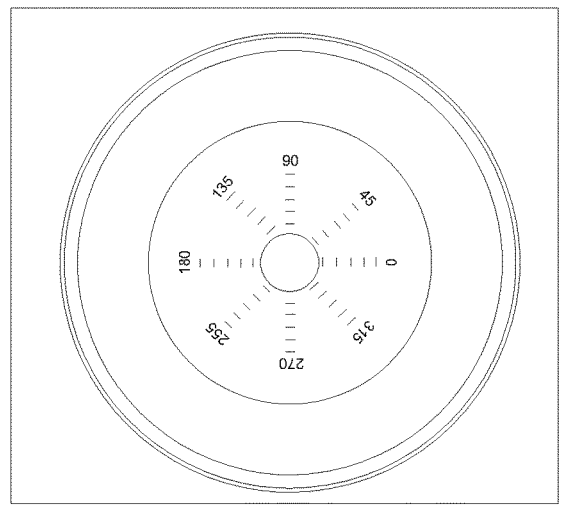
Figure 7:
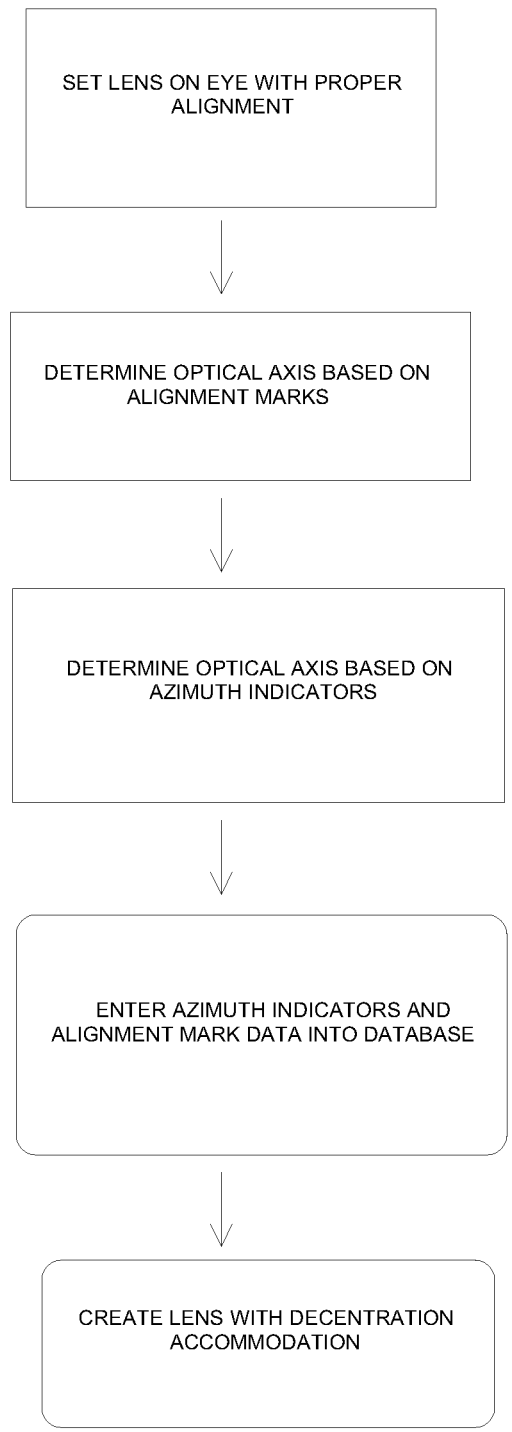
FIG. 7 is a flow chart of the current method.

Step 4: locate the area of highest concentration or number of alignment marks 13 on the position scale 25. As mentioned above, the alignment marks 13 are equidistant apart and represent 0.25 mm of correction or offset. Every 0.25 mm input for off-center has an indirect relationship to the center of the lens. As shown in FIG. 4, there may be areas or zones 27 that have a greater number of alignment marks such as at azimuth 45° having 3 alignment marks and azimuth 90° and azimuth 0° each having 2 alignment marks. There are also situations where the alignment marks are equal between two azimuths. For example, if azimuth 90° and azimuth 45° each have 4 alignment marks then the correction would be 4 alignment marks at 67.5° which is half of the distance between 45° and 90°.

Step 5: locate the azimuth 15 on the position scale 25. As discussed above, the azimuth may be represented by any measurement notation as long as it translates to the position of the pupil offset.

Step 6: evaluate the position of the pupil on the position scale 25 and set azimuth 15 for calculation of offset required for decentration accommodation. The number of alignment marks 13 in the visual zone represent the periscopic decenter. This is the degree to which the visual zone will be decentered in height. The decentered azimuth represents the angle of the decentered optic. Combined, the data provides the height and angle of decentration of the decentered optic. See FIGS. 1-4.

Step 7: enter the position scale 25 number and azimuth data in a computer database. Once the decentration is evaluated, the alignment marks and azimuth are noted on a form to determine centering of optics. See FIG. 6. This data is entered and processed in the software system and a prescription lens is generated. Entry of the information on a computer readable storage medium allows execution by a processor to perform operations for generating a decentered lens based upon the data entered. The data input includes inputted pupil information including lens center zone power, add zone diameter, periscopic decenter and decentration azimuth in degrees. The design information for a multifocal lens may also include physical dimensions of regions of the multifocal lens including a center region with the radius of curvature, the intermediate region with the radius of curvature and the outer region with the radius of curvature.

Step 8: generate a prescription lens having a decentration accommodation based upon the position scale and azimuth data. See FIG. 5.

Step 9: determination of visual outcome success to be made after fitting of the prescription lens.

While the present method and apparatus have been described in connection with the illustrated embodiment, it will be appreciated and understood that modifications may be made without departing, from the true spirit and scope.

We claim:

1. An ophthalmic diagnostic lens, comprising;
visible markings on a surface of said lens;
wherein a plurality of said markings are arranged in a plurality of groups, the plurality of groups comprising at least six groups, each group of the plurality of groups comprising at least four equidistantly spaced identical markings that are each radially aligned within the group as radially extending markings, the plurality of groups arranged equidistantly spaced circumferentially around the entire circumference of the lens with the plurality of markings within the plurality of groups as alignment members for determining lens decentration from a pupil center; and
said markings further comprising circumferentially spaced azimuth indicators.

2. The lens according to claim 1 wherein said visible markings are embedded within said lens.

3. The lens according to claim 1 wherein said markings comprise laser etchings.

4. The lens according to claim 1 wherein said markings comprise permanent ink.

5. The lens according to claim 1 wherein said lens further includes a lens positional placement alignment indicator marking.

6. The lens according to claim 1 wherein said alignment members each represent 0.25 mm of optic zone offset.

7. The lens according to claim 1 wherein said azimuth indicators comprise degree measurements.

8. The lens according to claim 1 wherein said azimuth indicators represent positional optic zone offset.

9. The lens according to claim 1 wherein said lens comprises a spherical, aspherical, toric, multifocal or bifocal ophthalmic lens.

10. An ophthalmic diagnostic lens having a plurality of visible markings on a surface of said lens,
wherein said plurality of visible markings are arranged in a plurality of groups, the plurality of groups comprising at least six groups, each group of the plurality of groups comprising at least four equidistantly spaced identical markings that are each radially aligned within the group as radially extending markings, the plurality of groups arranged equidistantly spaced circumferentially around the entire circumference of the lens with the plurality of markings within the plurality of groups as alignment members; and
wherein said plurality of groups further comprise visible azimuth indicators spaced at 45°.

* * * * *